July 13, 1965   M. AMAT BARGUES   3,194,228
SOLAR HEATER
Filed Feb. 24, 1964   2 Sheets-Sheet 1
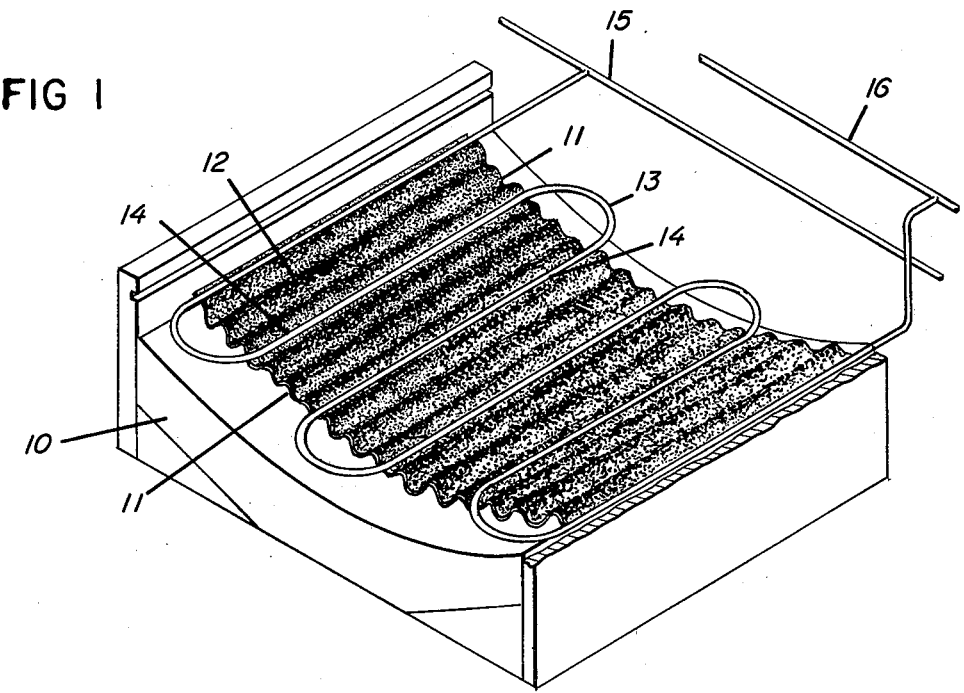
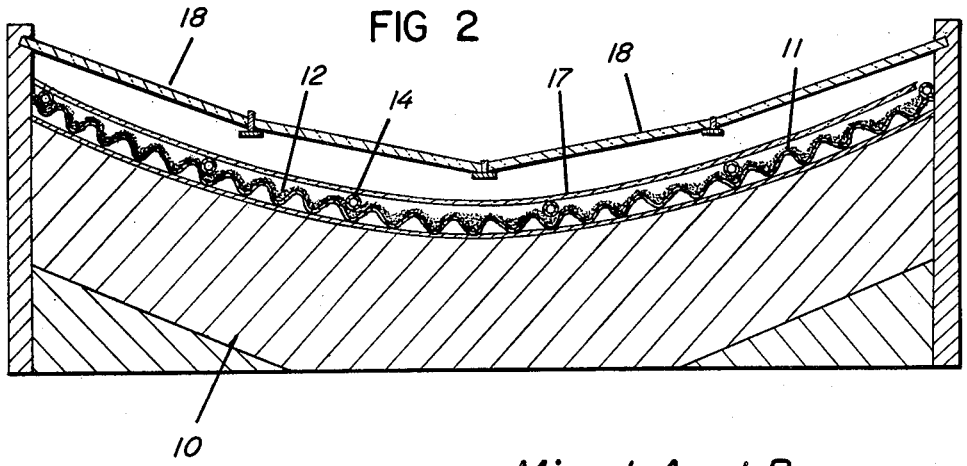
Miguel Amat Bargues
INVENTOR
BY
Wenderoth, Lind & Ponack
ATTORNEYS

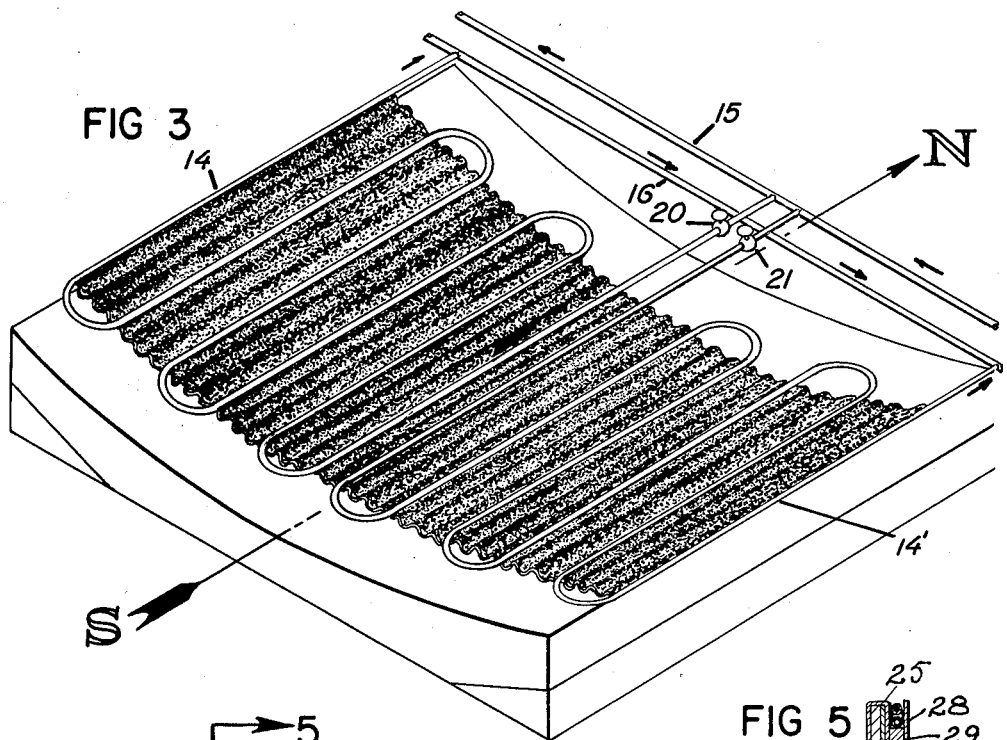
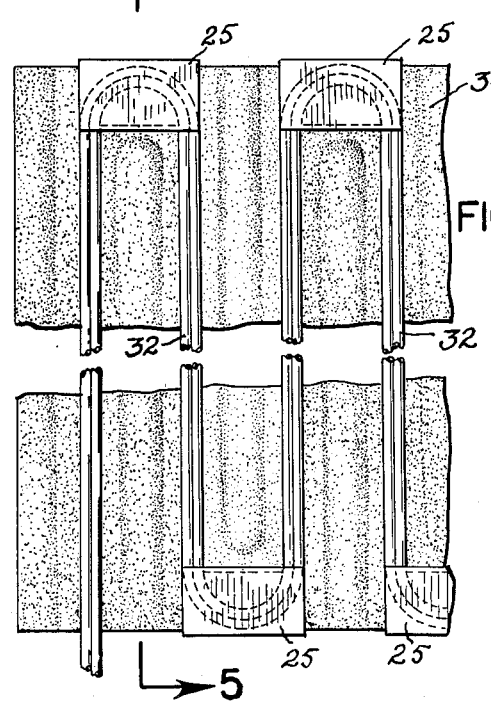
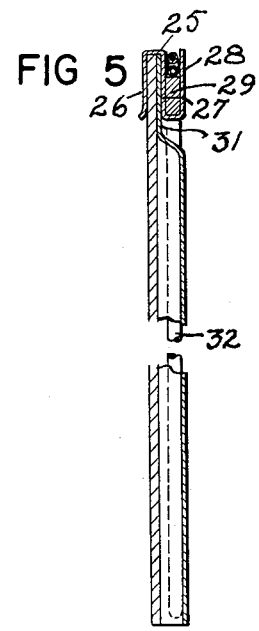
Miguel Amat Bargues
INVENTOR

3,194,228
SOLAR HEATER
Miguel Amat Bargues, Paseo de Gracia 77,
Barcelona, Spain
Filed Feb. 24, 1964, Ser. No. 346,968
Claims priority, application Spain, Feb. 13, 1959, 247,631
10 Claims. (Cl. 126—271)

This application is a continuation-in-part of my application Serial No. 7,191, filed February 8, 1960, entitled "System for Utilizing the Energy Contained in the Sun's Rays," now abandoned.

The present invention relates to a solar heater for the economic production of power by means of warm fluids.

An object of the invention is to provide a solar heater that can compete with the usual means of producing energy.

A further object of the invention is to provide a device wherein it is possible to raise water to a temperature of 160° C., thereby permitting a good performance and yield.

The system according to this invention consists essentially in arranging a special surface highly absorbent of the sun's rays, in combination with the means or a device permitting the circulation, in contact with the said surface, of a fluid, liquid or gas directly or indirectly heated by the said rays, and being completed by a means of protection against loss of heat, thereby setting up the circulation of the fluid at a relatively high temperature which can be easily used in a heat transforming apparatus.

A further object of the invention is to provide an absorbent surface comprising a sheet of corrugated cardboard of the usual type whose surface has been blackened with an application of amorphous carbon in the form of a paint or varnish which is deposited by any desired means on the cardboard and such a corrugated cardboard may be manufactured from a pulp in which a sufficient quantity of powdered carbon has been incorporated.

On the corrugated cardboard so prepared means are provided for procuring the circulation of a fluid, such means being the setting up of a bundle of tubes of a relatively small diameter or of one tube suitably bent in a serpentine shape and having several branches or sections parallel to each other at a suitable distance each of them being placed in contact with the bottom of one of the channels of the corrugated cardboard. In general, the whole installation may be sub-divided to form panels or parts with a surface of 1 m.² and in this case, the most advantageous arrangement for each part is that of tubes of small diameter, 5 mm. for instance, bent in a zigzag, its branches being lodged in definite spaced channels of the corrugated cardboard, leaving a certain number of empty channels, 2 to 10 for example, between one branch and the next.

Finally, the whole group of the absorbent surface and the fluid-circulation tubes is protected against loss of heat. In the first place, the corrugated cardboard is mounted on a supporting sheet of some suitable insulating material so as to avoid loss of heat through the back or under surface of the corrugated cardboard. On the upper surface, i.e. the part exposed to the sun's rays, a protection may be laid, consisting of a sheet of glass covering the whole of the absorbent surface, but separated from it by a few centimeters, and which opposes to the movement of the hot air.

This glass protector may be divided into a series of strips or panels placed side by side and, in order to reduce the weight, may be thin, and, if necessary, these strips may be joined together by any suitable means to ensure that the joints are hermetic and air tight.

This kind of protection is enough in most cases, but it has been found that it is advantageous to complete it by means of a sheet of another protective material laid directly on the absorbent layer, i.e. in contact with the grain of the carbon or with the corrugated cardboard. This said second protective sheet may be made of very thin glass or of any other transparent material, such as cellophane, cellulose acetate or other, and by means of this arrangement, the temperature reached by the absorbent surface is higher and the yield greater.

The above described installation is also completely heat insulating on all its sides and at the back.

Through the above-described tubes a fluid is caused to circulate that may be a gas or a liquid, though a gas and a liquid may be employed jointly. The gas may be put into circulation by means of a very powerful ventilator and at a feeble pressure, going in at one of the faces of the apparatus and leaving at the opposite one, for its conduction to the apparatus in which it will give up its excess heat, then going back to the absorbent apparatus to carry out its fresh cycle.

In the case of gases it is preferable to use steam, especially water steam, for the temperature of the absorbing apparatus is sufficient to boil the water at pressure of the atmosphere and even at a reduced pressure. Moreover, after being condensed, the steam goes back in the form of liquid through small diameter tubes that are easy to insulate thermically.

In the case of liquids, water or a watery uncongealable solution is used, so chosen as to avoid rust in the piping or the formation of deposits. The liquid is caused to circulate through the action of a feeble pressure pump, it being preferable to adopt the above-mentioned arrangement of tubes laid in parallel branches separated from each other for each panel or section, and moreover, the branches should not be too near together, for, on the one hand, the weight and price would be excessive for each part and, on the other hand, a considerable pressure would be needed to cause the liquid to circulate through the tubes.

To assure the best transmission of the heat the corrugated cardboard should be placed on a thin metal conductor sheet, such as, for example, ½ mm. aluminium, which will help to make the heat pass from one channel to the next and contribute to its greater utility. Tubes of plastic material may also be used, the conductability itself of the material they are made of is of small importance but in every case the tube should be black to obtain a greater absorption of the heat rays. At the outlet all the tubes are joined together in a single collector that transmit the hot liquid to the apparatus that is to use it, and after the liquid has given up its excess heat to this utilizing apparatus its carried by another collector to the absorbing apparatus and continues circulating thus in a closed circuit. One has to bear in mind that the liquid ought not to contain any dissolved gases, so as to avoid any giving off of these gases under the influence of the heat, causing the obstruction of the tubes.

In practice, panels or surfaces of determines sizes may be used, suitable coupled together to form a surface of the necessary extent for the energy it is desired to obtain, and the said individual panels may also be advantageously arranged so as to form curved surfaces to assist the absorption of the heat during the hours near to the rising or the setting of the sun. The bundle of tubes may, at option, be divided into two or more sections connected independently to the collector, in combination with a means of cutting off the circulation in one or other of the sections so as to isolate these that eventually receive the solar rays at a tangent.

A still further object is to provide a construction wherein the tubes used are secured by means of special clips at their bending points so as to securely fasten them in place.

With the above and other objects in view which will become apparent from the following detailed description, some preferred forms of the invention are shown in the drawings, in which:

FIGURE 1 is a perspective view of a unitary panel with certain parts omitted for greater clarity.

FIGURE 2 is a cross-sectional view of the form of the invention illustrated in FIGURE 1 with additional parts added thereto.

FIGURE 3 is a perspective view of a modification wherein the circulating tubes are divided into two sections.

FIGURE 4 is a partial plan view of a further modification illustrating particularly the means for fastening the tubes to the absorbent surface, and FIGURE 5 is a cross-sectional view taken upon section line 5—5 of FIGURE 4.

The drawings show an elementary form of constructing a sun rays absorbing panel comprising a base 10 of a suitable material and having a curved surface to which a sheet of corrugated cardboard 11 is applied, blackened or covered with a layer 12 of a composition of amorphous carbon or some other sunray-absorbing material and, in the channel formed by the corrugation a serpentine piece 13 is fittted, being composed of a zigzag bent tube with parallel branches 14 that fit into the bottom of certain spaced-out channels and corrugations.

The ends of the said serpentine piece extend as far as the margin of the panel and end in a suitable shape that allows it to be coupled to two collector tubes 15, 16, constituting the feeding line connecting several contiguous panels. Each of the panels thus formed is covered, as was stated above, by means of a thin, transparent sheet 17 situated very near to the blackened surface and at a certain distance from it there is a protection 18 of thick glass or of some suitable transparent material either in one single piece or made up of several smaller pieces so arranged that the absorbing elements are completely insulated from the weather.

A most advantageous arrangement is that shown in FIGURE 3 wherein the bundle of tubes is divided into two sections, as 14 and 14′, each one of which extends on opposed parts of the curved supporting surface, forming two symmetrical sections of tubes that are independently coupled to the collector tubes 15 and 16 through the cocks 20 and 21, which permit independent functioning of the said sections, coupling either one of the sections, or both at the same time according to the altitude of the sun on the horizon.

The heat absorbent surface has its surface corrugated and is made of cardboard.

In the first place, cardboard is a highly insulating and heat absorbent material, and moreover it is cheap and light. In the second place, the disposition of the corrugated surface forming parallel channels results in that in each channel there is formed an accumulation of clarific rays of the sun, which are received by the portion of the fluid conducting tube, which is situated in the central part of said channel or corrugation.

In this apparatus therefore each one of the portions of the fluid conducting tube receives heat under three forms:

(a) By direct incidence of the rays of the sun.

(b) By contact of the lower part of the tube with its support surface.

(c) By radiation of the walls of each one of the channels or corrugations of the support plate.

All this results in a better utilization of the solar heat, all other conditions being equal, since the very nature of the cardboard avoids heat loss, because, in comparison with a metallic surface, it is to be taken into account that a metallic surface, being a good conductor of heat, has heat loss at the posterior side of the plate, and moverover has also heat loss due to the reflection of the calorific rays which strike the side receiving these rays.

When metallic surfaces are used in a solar heater the loss by reflection is quite important and such loss should be avoided as is done in the present device. Furthermore, the corrugated cardboard support surface is bent in a cylindrical form according to an axis parallel to the axis of the channels of the corrugated cardboard and the panel when placed in its operative position is disposed with the axis of the cylindrical surface thereof parallel to the axis of the earth and in South-North direction as indicated in FIGURE 3.

FIGURES 4 and 5 illustrate a constructional detail for securing the plastic tubes firmly in place upon a corrugated cardboard surface which extends over all the length of the tubes. This is accomplished by providing clips 25 of S-shape as shown particularly in FIGURE 5. The rear leg 26 together with the median portion 27 is designed to clamp the clip upon the edge of the cardboard absorbent surface 30. The median portion 27 together with the front 28 of the clip forms a channel or groove in which semi-circular guiding pieces 29 are inserted. The guiding pieces 29 are secured to the clip 25 in any desired manner. When the clip 25 is applied to the edge of the cardboard surface it will crush the same somewhat as indicated at 31 in FIGURE 5.

The clips 25 are fastened to the cardboard as shown in FIGURE 4 and extends between every two supporting channels thereof. It is then an easy matter to wind the tubes 32 in the groove of the clips 25 and supported by the semi-circular guiding pieces 29. By the use of the clips 25 and associated parts the plastic tube or tubes will be properly aligned and at the same time properly fastened to the cardboard sheet.

The cardboard sheets may be suitably corrugated or bent and the channels therein may be designed of the proper size which is deemed suitable for the number of tubes which it may be desired to use. As shown in FIGURES 4 and 5 two tubes are used but this number may be increased as desired.

When using plastic tubes it is preferable to use tubes which have a relatively small diameter since this permits the use of two or more tubes in contact thereby forming a bundle and the correct portions thereof may be placed jointly in the same channel.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A solar heater comprising a housing of insulating material, a corrugated cardboard sheet in said housing forming a heat absorbent support member, a layer of amorphous carbon on the upper surface of said sheet, a bundle of tubes of blackened plastic material with parallel straight portions supported by said sheet, said straight portions lying in the bottom of correspondingly spaced channels in said corrugated cardboard, and means for passing a heat exchange fluid through said tubes.

2. A solar heater as claimed in claim 1 wherein said support surface is bent in cylindrical form according to an axis parallel to the axis of the channels of the corrugated cardboard, and said bundle of serpentine tubes is arranged on said support forming two symmetrical sections, said heater being set for operation with the axis of said cylindrical surface parallel to the axis of the earth, in a direction South to North, so that one of said two symmetrical sections is lighted in the morning and the other in the evening, said sections having means for passing a heat exchange fluid through one or both sections of tubes and allowing the fluid circulation direction to be inverted at midday.

3. A solar heater as claimed in claim 1, wherein beneath said heat absorbent support member a thin metal conductor sheet is located to uniformly distribute the heat.

4. A solar heater comprising a housing of insulating material, a corrugated cardboard sheet in said housing forming a heat absorbent support member, a layer of amorphous carbon on the upper surface of said sheet, a bundle of tubes of plastic material with parallel straight portions supported by said sheet, said straight portions lying in the bottom of correspondingly spaced channels in said corrugated cardboard and the curved end portions of said tubes protruding from the edges of said support member, and means for passing a heat exchange fluid through said tubes.

5. A solar heater as claimed in claim 4, wherein said support surface is bent into two opposed parts, each part of said support surface supporting a section of tubes in serpentine fashion set with its axis placed parallel to the axis of the curved support and to the axis of the earth in a direction South to North, inlet and outlet collectors, and means including said collectors for passing a heat exchange fluid through one or both sections of tubes.

6. A solar heater as claimed in claim 4, wherein beneath the absorbent surface constituted by said corrugated cardboard a thin sheet of metal conductor is located to uniformly distribute the heat.

7. A solar heater comprising a housing of insulating material, a corrugated cardboard sheet in said housing forming a heat absorbent support member, a layer of amorphous carbon on the upper surface of said sheet, a bundle of tubes of plastic material supported by said sheet, said tubes being bent in serpentine fashion with spaced parallel portions, said parallel portions lying in the bottom of correspondingly spaced channels in said corrugated cardboard, a clip for securing said bent portions of said tubes to said sheet, and means for passing a heat exchange fluid through said tubes.

8. A solar heater as set forth in claim 7 wherein said clip is of S-shape in cross section and one of the grooves therein is provided with a semi-circular element to support the bent portions of said tubes.

9. A solar heater as set forth in claim 8 wherein the other groove in said clip clamps said sheet.

10. A solar heater comprising a housing of insulating material, a corrugated cardboard sheet in said housing forming a heat absorbent support member, a layer of amorphous carbon on the upper surface of said sheet, a bundle of tubes of plastic material supported by said sheet, said tubes being bent in serpentine fashion with spaced parallel portions, said parallel portions lying in the bottom of correspondingly spaced channels in said corrugated cardboard with the curved end portions of said tubes resting on the edges of said support member, a clip for securing said bent portions of said tubes to said sheet, and means for passing a heat exchange fluid through said tubes.

References Cited by the Examiner

UNITED STATES PATENTS

| 1,242,511 | 10/17 | Bailey | 126—271 |
| 1,814,897 | 7/31 | Coxe | 126—270 |
| 1,971,242 | 8/34 | Wheeler | 126—271 |
| 2,277,311 | 3/42 | Freeman | 126—271 |
| 2,311,579 | 2/43 | Scott | 126—271 |
| 2,517,411 | 8/50 | Patterson | 165—171 |
| 2,594,232 | 4/52 | Stockstill | 126—271 X |
| 2,608,968 | 9/52 | Moseley | 126—271 |
| 2,705,948 | 4/55 | Rostock | 126—271 |

FOREIGN PATENTS 892,332   1/44   France.

JAMES W. WESTHAVER, *Primary Examiner.*